(12) United States Patent
Fujisaki et al.

(10) Patent No.: US 9,624,140 B2
(45) Date of Patent: Apr. 18, 2017

(54) GAS GENERATING COMPOSITION AND GAS GENERATOR USING THE SAME

(71) Applicant: DAICEL CORPORATION, Osaka (JP)

(72) Inventors: Yoji Fujisaki, Tatsuno (JP); Naoki Matsuda, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 14/424,902

(22) PCT Filed: Sep. 20, 2013

(86) PCT No.: PCT/JP2013/075409
§ 371 (c)(1),
(2) Date: Feb. 27, 2015

(87) PCT Pub. No.: WO2014/061397
PCT Pub. Date: Apr. 24, 2014

(65) Prior Publication Data
US 2015/0225308 A1  Aug. 13, 2015

(30) Foreign Application Priority Data
Oct. 18, 2012 (JP) .................................. 2012-230685

(51) Int. Cl.
*B60R 21/26* (2011.01)
*C06B 31/00* (2006.01)
(Continued)

(52) U.S. Cl.
CPC ............ *C06B 31/00* (2013.01); *B60R 21/264* (2013.01); *B60R 21/2644* (2013.01);
(Continued)

(58) Field of Classification Search
CPC ... C06B 31/00; B60R 21/264; B60R 21/2644; B60R 2021/2642; B60R 2021/26011; C06D 5/06
See application file for complete search history.

(56) References Cited

U.S. PATENT DOCUMENTS 5,608,183 A   3/1997 Barnes et al.
6,412,815 B1  7/2002 Nakashima et al.
(Continued)

FOREIGN PATENT DOCUMENTS

CN   1398244 A   2/2003
CN   1503768 A   6/2004
(Continued)

OTHER PUBLICATIONS

International Search Report, issued in PCT/JP2013/075409, dated Nov. 26, 2013.
(Continued)

*Primary Examiner* — Drew Brown
(74) *Attorney, Agent, or Firm* — Birch, Stewart, Kolasch & Birch, LLP

(57) ABSTRACT

Provided is a gas generating composition that maintains stable ignition performance for a long period. A gas generating composition includes: a gas generating agent including (a) fuel selected from a triazine compound and a guanidine compound, (b) an oxidizing agent including a Combination of (b-1) basic metal nitrate and (b-2) basic metal carbonate, and (c) a binder; and (d) an absorbent. The gas generating agent and the absorbent may not be integrally molded or may be integrally molded.

12 Claims, 3 Drawing Sheets

(51) Int. Cl.
    *B60R 21/264* (2006.01)
    *C06D 5/06* (2006.01)
    *C06B 23/02* (2006.01)
(52) U.S. Cl.
    CPC ............... *C06B 23/02* (2013.01); *C06D 5/06*
        (2013.01); *B60R 2021/26011* (2013.01); *B60R*
        *2021/2642* (2013.01)

(56) References Cited

U.S. PATENT DOCUMENTS

| | | | | |
|---|---|---|---|---|
| 6,540,256 | B2* | 4/2003 | Iwai | B60R 21/2644 |
| | | | | 280/736 |
| 6,820,556 | B1* | 11/2004 | Oda | B60R 21/2644 |
| | | | | 102/202.14 |
| 6,948,737 | B2* | 9/2005 | Ohji | B60R 21/2644 |
| | | | | 280/736 |
| 7,150,227 | B2* | 12/2006 | Matsuda | B60R 21/2644 |
| | | | | 102/202 |
| 7,172,214 | B2* | 2/2007 | Matsuda | B01D 46/2403 |
| | | | | 280/741 |
| 7,175,197 | B2* | 2/2007 | Iwai | B60R 21/2644 |
| | | | | 280/736 |
| 7,651,129 | B2* | 1/2010 | Nakayasu | B60R 21/2644 |
| | | | | 280/741 |
| 7,722,078 | B2* | 5/2010 | Yamazaki | B60R 21/261 |
| | | | | 280/739 |
| 8,567,319 | B2* | 10/2013 | Ukita | F42B 3/04 |
| | | | | 102/530 |
| 9,139,156 | B2* | 9/2015 | Bierwirth | B60R 21/2644 |
| 2003/0024618 | A1 | 2/2003 | Wu et al. | |
| 2004/0060469 | A1 | 4/2004 | Yamato et al. | |
| 2004/0123925 | A1 | 7/2004 | Wu | |
| 2007/0163457 | A1 | 7/2007 | Matsumura et al. | |
| 2007/0187011 | A1 | 8/2007 | Kubo et al. | |
| 2008/0105342 | A1 | 5/2008 | Wu et al. | |
| 2008/0149233 | A1 | 6/2008 | Kobayashi | |
| 2013/0319586 | A1 | 12/2013 | Kobayashi | |
| 2013/0340900 | A1 | 12/2013 | Kobayashi et al. | |

FOREIGN PATENT DOCUMENTS

| | | |
|---|---|---|
| CN | 1556782 A | 12/2004 |
| CN | 1969167 A | 5/2007 |
| EP | 1 241 153 A1 | 9/2002 |
| JP | 9-328389 A | 12/1997 |
| JP | 11-343191 A | 12/1999 |
| JP | 2001-97176 A | 4/2001 |
| JP | 2001-213688 A | 8/2001 |
| JP | 4703837 B2 | 6/2011 |
| WO | WO 99/54270 A1 | 10/1999 |
| WO | WO 2012/128302 A1 | 9/2012 |
| WO | WO 2012/133072 A1 | 10/2012 |

OTHER PUBLICATIONS

Written Opinion of the International Searching Authority, issued in PCT/JP2013/075409, dated Nov. 26, 2013.
English translation of International Preliminary Report on Patentability and Written Opinion mailed Apr. 30, 2015, in PCT International Application No. PCT/JP2013/075409.

* cited by examiner

GAS GENERATING COMPOSITION AND GAS GENERATOR USING THE SAME

TECHNICAL FIELD

The present invention relates to a gas generating composition used in a gas generator for an airbag apparatus, and a gas generator for an airbag apparatus using the gas generating composition.

BACKGROUND ART

A gas generator is required to steadily operate even after the gas generator is continuously mounted on a vehicle for a long period under a severe temperature condition. To cope with various environmental changes, the gas generator is required to unfailingly ignite a gas generating agent therein and exhibit predetermined performance even under an extreme temperature condition at −45° C. to +85° C.

Therefore, it is important for the gas generator to surely carry out the ignition of the gas generating agent at an initial stage of the operation of the gas generator.

It is known that the gas generating agent thermally decomposes when it is exposed to high temperature under the presence of moisture. Therefore, as disclosed in JP-B No. 4703837 (JP-A No. 2001-213688), JP-A No. H11-343191, and WO-A No. 99/54270, zeolite is used to increase heat resistance of the gas generating agent.

On the other hand, recently, a gas generating agent having a low combustion temperature is used. This is because, if the combustion temperature can be lowered, it is possible to reduce an amount of use of a coolant/filter necessary for the gas generator and reduce the size and the weight of the gas generator.

As such a gas generating agent, a gas generating agent including basic metal nitrate disclosed in JP-A No. H09-328389 is used.

SUMMARY OF THE INVENTION

The present invention provides a gas generating composition including:
a gas generating agent including
(a) fuel selected from a triazine compound and a guanidine compound,
(b) an oxidizing agent including a combination of (b-1) basic metal nitrate and (b-2) basic metal carbonate, and
(c) a binder; and
(d) an absorbent.

The present invention also provides a gas generator for an airbag apparatus that uses the above gas generating composition.

A gas generator of the present invention is a gas generator for an airbag apparatus using the gas generating composition,
the gas generator including:
a housing having a gas discharge port and serving as an outer shell container;
a cylindrical filter arranged in the housing having the gas discharge port, such that an outer circumferential surface thereof directly faces the gas discharge port via a cylindrical space and that both end surfaces thereof are in contact with a top surface and a bottom surface of the housing respectively;
a combustion chamber formed by an inner space of the cylindrical filter, excluding an ignition device arranged in the center;
the gas generating composition being stored in the combustion chamber.

A gas generator of the present invention is a gas generator for an airbag apparatus using the gas generating composition,
the gas generator including:
a housing having a gas discharge port and serving as an outer shell container;
a cylindrical filter arranged in the housing having the gas discharge port, such that an outer circumferential surface thereof directly faces the gas discharge port via a cylindrical space and that both end surfaces thereof are in contact with a top surface and a bottom surface of the housing respectively;
a combustion chamber formed by an inner space of the cylindrical filter, excluding an ignition device arranged in the center;
the combustion chamber being divided into two chambers by an air-permeable partition plate, one of the two chambers charged with a gas generating agent, the other chamber charged with an absorbent.

A gas generator of the present invention is a gas generator for an airbag apparatus using the gas generating composition,
the gas generator including:
a housing having a gas discharge port and serving as an outer shell container;
a cylindrical filter arranged in the housing having the gas discharge port, such that an outer circumferential surface thereof directly faces the gas discharge port via a cylindrical space and that both end surfaces thereof are in contact with a top surface and a bottom surface of the housing respectively;
a combustion chamber formed by an inner space of the cylindrical filter, excluding an ignition device arranged in the center;
the cylindrical space being divided by an air-permeable partition plate into a first space including the gas discharge port and a second space not including the gas discharge port;
a gas generating agent being charged in the combustion chamber;
an absorbent being charged in the second space.

A gas generator of the present invention is a gas generator for an airbag apparatus using the gas generating composition,
the gas generator including:
a housing having a gas discharge port and serving as an outer shell container;
a cylindrical filter arranged in the housing having the gas discharge port, such that an outer circumferential surface thereof directly faces the gas discharge port via a cylindrical space and that both end surfaces thereof are in contact with a top surface and a bottom surface of the housing respectively;
a combustion chamber formed by an inner space of the cylindrical filter, excluding an ignition device arranged in the center;
an annular recessed portion, which is formed by recessing an end surface of the cylindrical filter in an axial direction, being provided at least one of boundary portions between the respective end surfaces of the cylindrical filter and the top surface and the bottom surface of the housing;
a gas generating agent being charged with the combustion chamber;

an absorbent being charged in the annular recessed portion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
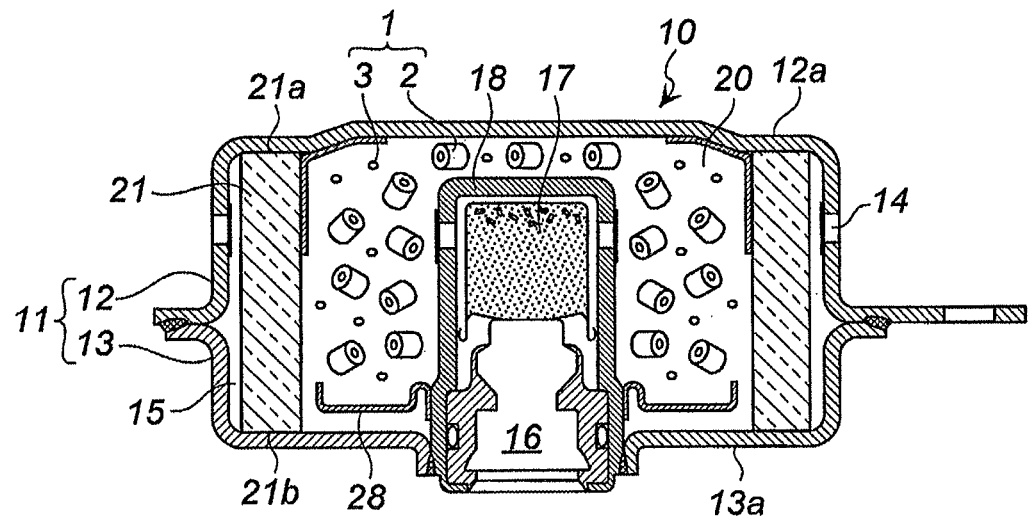
FIG. 1 is an axial sectional view of a gas generator using a gas generating composition of the present invention.

In the gas generating agent including basic metal nitrate, disclosed in JP-A No H09-328389, moisture occurs during decomposition of the gas generating agent while the gas generating agent is mounted on a vehicle for a long period, and the moisture deteriorates an ignition ability of the gas generating agent.

The gas generating agent including basic metal nitrate is an oxidizing agent effective for reducing a combustion temperature. However, the ignition ability is deteriorated by the moisture that occurs during thermal decomposition. Therefore, a reduction in the size and the weight of the gas generating agent due to a reduction in the combustion temperature is inconsistent with realization of a secure operation under a severe condition due to stable ignition ability.

In particular, if an agent corresponding to "foreign matters", which does not chemically react by itself and exhibits physical absorption action like zeolite, used in JP-B No. 4703837, JP-A No. H11-343191, and WO-A No. 99/54270, is applied to the gas generating agent having the low combustion temperature, the ignition ability is deteriorated. Therefore, the application of such an agent to the gas generating agent should be avoided.

The present invention is to provide a gas generating composition that maintains high ignition ability even after the elapse of a long period and a gas generator for an airbag apparatus using the gas generating composition.

The gas generating composition of the present invention maintains high ignition ability even after the elapse of a long period.

EMBODIMENTS OF THE INVENTION

Gas Generating Composition

A gas generating composition of the present invention includes a combination of a gas generating agent including components (a) to (c) and an absorbent.

[Gas Generating Agent]

Fuel of the component (a) is selected from a triazine compound and a guanidine compound.

The fuel of the component (a) is preferably one or more selected from melamine, melamine cyanurate, nitroguanidine, and guanidine nitrate.

Further, the fuel of the component (a) preferably includes melamine cyanurate (MC) and nitroguanidine (NQ).

A mass ratio (MC/NQ) of MC and NQ of the fuel including melamine cyanurate (MC) and nitroguanidine (NQ) is preferably 0.2 to 1.5 and more preferably 0.5 to 1.3 in order to improve ignition ability.

An oxidizing agent of the component (b) includes a combination of (b-1) basic metal nitrate and (b-2) basic metal carbonate.

An example of the basic metal nitrate of the component (b-1) includes basic copper nitrate, basic cobalt nitrate, basic zinc nitrate, and basic magnesium nitrate, and basic copper nitrate is preferable.

An example of the basic metal carbonate of the component (b-2) includes basic copper carbonate and basic zinc carbonate, and basic copper carbonate is preferable.

In the oxidizing agent of the component (b), contents of the basic metal nitrate of the component (b-1) and the basic metal carbonate of the component (b-2) are preferably in a relation of (b-1)>(b-2).

In the oxidizing agent of the component (b), the mass ratio (b-1)/(b-2) of the basic metal nitrate of the component (b-1) and the basic metal carbonate of the component (b-2) is 1.0 to 25, preferably 1.20 to 13.0, and more preferably 1.5 to 10.0 in order to improve the ignition ability.

An example of a binder of the component (c) include one or two or more selected from carboxymethyl cellulose (CMC), carboxymethylcellulose sodium salt (CMCNa), carboxymethylcellulose potassium salt, carboxymethylcellulose ammonium salt, cellulose acetate, cellulose acetate butyrate (CAB), ethylcellulose (EC), hydroxyethylcellulose (HEC), microcrystalline cellulose, polyacrylhydrazide, a copolymer of acrylamide and a metal salt of acrylic acid, a copolymer of polyacrylamide and a polyacrylic acid ester compound, acryl rubber, and silicone.

In the gas generating agent, content rates of the component (a) and the component (b) are as described below.

The component (a) is preferably 10 to 60% by mass, more preferably 10 to 50% by mass, and even more preferably 15 to 30% by mass.

The component (b) is preferably 40 to 90% by mass, more preferably 50 to 90% by mass, and even more preferably 70 to 85% by mass.

In the gas generating agent, a content rate of the component (c) is preferably 1 to 20 parts by mass, more preferably 2 to 15 parts by mass, and even more preferably 3 to 10 parts by mass with respect to total 100 parts by mass of the components (a) and (b).

The gas generating agent can further contain a known additive.

An example of the known additive includes metal oxides such as copper (II) oxide, iron oxide, zinc oxide, cobalt oxide, manganese oxide, molybdenum oxide, nickel oxide, bismuth oxide, silica, and alumina; metal hydroxides such as aluminum hydroxide, magnesium hydroxide, cobalt hydroxide and iron hydroxide; cobalt carbonate, calcium carbonate; complex compounds of metal oxide or hydroxide such as Japanese acid clay, kaolin, talc, bentonite, diatomaceous earth, and hydrotalcite; metal acid salts such as sodium silicate, mica molybdate, cobalt molybdate, and ammonium molybdate; molybdenum disulfide, calcium stearate, silicon nitride, silicon carbide, metaboric acid, boric acid, and anhydrous boric acid.

[Absorbent]

An example of an absorbent of the component (d) includes one or more selected from synthetic zeolite (molecular sieves), natural zeolite, activated alumina, silica gel, activated carbon and clay (e.g., Japanese acid clay, bentonite, diatomaceous earth, kaolin, and talc), solid superstrong acid such as zirconia sulfate, and solid acid such as solid phosphoric acid, silica-alumina, and silica-manesia.

Among these components, one or more selected from synthetic zeolite, natural zeolite, activated alumina, silica gel, and activated carbon and clay are preferable. In particular, synthetic zeolite is preferable.

An example of the synthetic zeolite includes synthetic zeolite selected from a 3A type (pore diameter 3 Å), a 4A type (pore diameter 4 Å), a 5A type (pore diameter 5 Å), and a 13X type (pore diameter 10 Å).

The gas generating composition of the present invention can be a gas generating composition in which a gas generating agent and an absorbent are not integrally molded.

The composition can be a combination of a molded article of the gas generating agent and a molded article of the absorbent. However, it is preferable that the molded article of the gas generating agent is larger than the molded article of the absorbent.

The gas generating composition of the present invention can be a gas generating composition in which the gas generating agent and the absorbent are integrally molded.

In the gas generating composition of the present invention, as a content rate of the gas generating agent and the absorbent, the absorbent is 0.5 to 1.5 parts by mass with respect to 100 parts by mass of the gas generating agent.

The gas generating composition of the present invention can be molded into desired shapes and can be molded into a molded article in a single-perforated columnar shape, a perforated (porous) columnar shape or a pellet shape. The molded article can be manufactured by a method including the steps of adding water or an organic solvent to the gas generating composition, mixing them and extrusion-molding the resultant (a molded article in a single-perforated columnar shape and a perforated (porous) columnar shape), or a method of compression-molding the gas generating composition using a tablet machine or the like (a molded article in a pellet shape).

The gas generating composition of the present invention can also be used as an ignition agent called an enhancer agent (or a booster) for transmitting energy of a detonator or a squib to the gas generating agent.

<Gas Generator>

In a gas generator for an airbag apparatus of the present invention, the gas generating composition of the present invention described above is used.

The gas generating composition may be a gas generating composition in which the gas generating agent and the absorbent are not integrally molded, or may be a gas generating composition in which the gas generating agent and the absorbent are integrally molded.

The absorbent can be powder, or molded into a pellet shape, a single-perforated shape, a perforated (porous) shape, or other shape.

Preferred, embodiments are explained below with reference to the drawings.

[Gas generator shown in FIG. 1]

A gas generator 10 shown in FIG. 1 includes, as an outer shell container, a housing 11 having a gas discharge port 14. The gas discharge port 14 is closed by a moisture-proof tape (an aluminum tape), not shown in the drawing, from the inner side.

The housing 11 is obtained by welding and integrating a diffuser shell 12 and a closure shell 13 in the flange portions thereof.

A cylindrical filter (a coolant/filter) 21 is provided inside the housing 11. The cylindrical filter 21 is arranged such that an outer circumferential surface thereof directly faces the gas discharge port 14 via a cylindrical space 15 and that both end surfaces thereof 21a and 21b are in contact with a top surface 12a of the housing and a bottom surface 13a of the housing respectively.

An inner space of the cylindrical filter 21, which is a space excluding an ignition device arranged in the center, is a combustion chamber 20.

The ignition device is obtained by providing an electric igniter 16 and a transfer charge 17 into a cup 18 fixed to the bottom surface 13a.

In the combustion chamber 20, a retainer 28 for adjustment of a capacity of the combustion chamber and retention of a gas generating agent 2 is fixed by being fit to the cup 18 on the bottom surface 13a side.

In the combustion chamber 20, a gas generating composition 1 including the gas generating agent 2 of a single-perforated molded article (in a columnar shape having a through-hole in the center) and a granular absorbent 3 is stored.

The gas generating composition 1 may be a molded article including a gas generating agent and an absorbent.

In the gas generator 10 shown in FIG. 1, a retainer having multiple holes can be used as the retainer 28. The absorbent 3 can be arranged between the bottom surface 13a and the retainer 28.

In the gas generator 10 shown in FIG. 1, even if moisture occurs in the housing while the gas generator 10 is mounted on a vehicle as a gas generator for an airbag apparatus for a long time (e.g., 10 years or more) or because of combustion at actuation, the moisture is captured by the absorbent. Therefore, the moisture does not adversely affect combustion performance.

Further, the gas generating agent included in the composition of the present invention reduces a combustion temperature. Therefore, it is possible to reduce a weight/volume of the coolant/filter.

Figure 2:
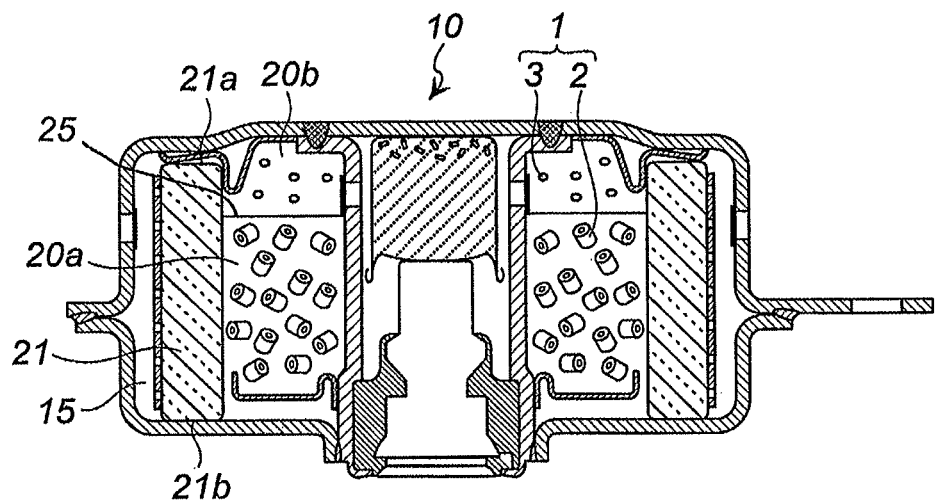
FIG. 2 is an axial sectional view of a gas generator of another embodiment, apart from FIG. 1.

[Gas Generator Shown in FIG. 2]

The gas generator 10 shown in FIG. 2 has substantially the same structure as that of the gas generator 10 shown in FIG. 1 and can obtain the same action and effects. However, the gas generator 10 shown in FIG. 2 is different in the structure of a combustion chamber and a storage of the gas generating composition 1.

In the gas generator 10 shown in FIG. 2, the combustion chamber 20 is divided into two chambers, i.e., a first chamber 20a on the lower side in the axial direction and a second chamber 20b on the upper side in the axial direction by a partition plate 25.

The partition plate 25 is air-permeable. A net, a perforated plate, and the like can be used.

In the first chamber 20a, the gas generating agent 2 of the single-perforated molded article is stored. In the second chamber 20b, the granular absorbent 3 is stored. The capacity of the first chamber 20a is larger than the capacity of the second chamber 20b.

Figure 3:
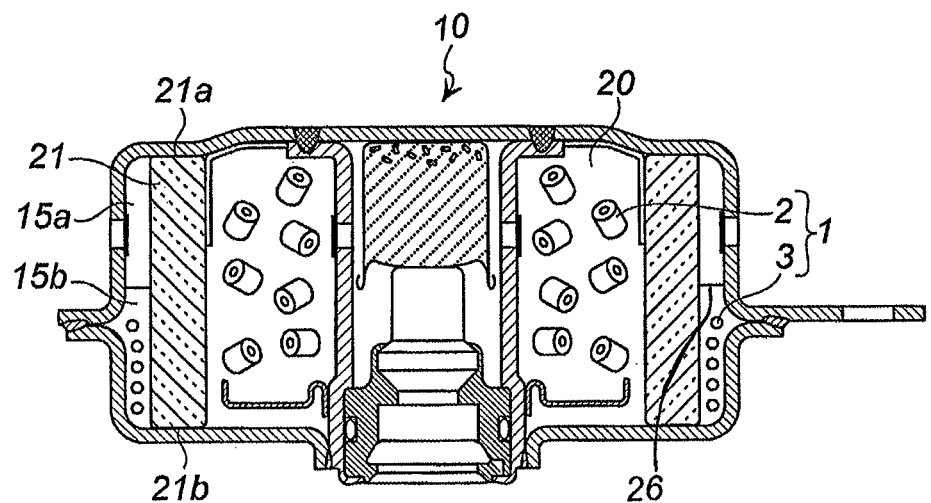
FIG. 3 is an axial sectional view of a gas generator of another embodiment, apart from FIGS. 1 and 2.

[Gas Generator Shown in FIG. 3]

The gas generator 10 shown in FIG. 3 has substantially the same structure as that of the gas generator 10 shown in FIG. 1 and can obtain the same action and effects. However, the gas generator 10 shown in FIG. 3 is different in the structure of the cylindrical space 15 and a storage of the gas generating composition 1.

The cylindrical space 15 is divided into a first space 15a including the gas discharge port 14 and a second space 15b not including the gas discharge port 14 by an air-permeable partition plate 26.

The gas generating agent 2 of the single-perforated molded article is stored in the combustion chamber 20. The granular absorbent 3 is stored in the second space 15b.

Figure 4:
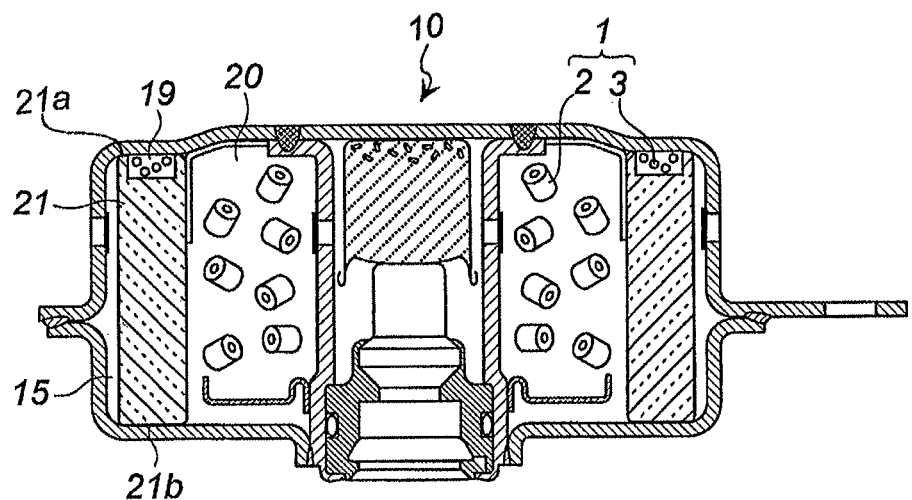
FIG. 4 is an axial sectional view of a gas generator of another embodiment, apart from FIGS. 1, 2, and 3.

[Gas Generator Shown in FIG. 4]

The gas generator 10 shown in FIG. 4 has substantially the same structure as that of the gas generator 10 shown in FIG. 1 and can obtain the same action and effects. However, the gas generator 10 shown in FIG. 4 is different in the structure of the cylindrical filter 21 and a storage of the gas generating composition 1.

An end surface 21a (on the top surface 12a side) of the cylindrical filter is recessed in the axial direction to form an annular recessed portion 19. Three surfaces of the annular recessed portion 19 are surrounded by the cylindrical filter 21 and the remaining surface is in contact with the top surface 12a.

The gas generating agent 2 of the single-perforated molded article is charged in the combustion chamber 20. The granular absorbent is charged in the annular recessed portion 19.

The gas generator (an inflator) of the present invention can be applied to inflators for airbags of driver side, inflators for airbags of passenger side next to the driver, inflators for side airbags, inflators for inflatable curtains, inflators for knee bolsters, inflators for inflatable seat belts, inflators for tubular systems, and inflators for pretensioners of various vehicles.

The gas generator (the inflator) of the present invention may be a pyrotechnic type in which supply of gas is from only the gas generating agent or may be a hybrid type in which supply of gas is from both of compressed gas such as argon and the gas generating agent.

EXAMPLES

Examples 1 to 7

Gas Generating Agents

Gas generating agents (not containing an absorbent) having compositions shown in Table 1 were manufactured. Concerning these gas generating agents, measurement of items shown in Table 1 was performed. A result of the measurement is shown in Table 1.

(1) Combustion Temperature

A combustion temperature based on a theoretical calculation.

(2) Burning Rate

<Method for Preparing a Columnar Strand>

Molded articles of the compositions of Examples and Comparative Examples were crushed in an agate mortar. Powder was caused to pass through a wire gauge with aperture of 500 μm, and filled on a receiving side of a predetermined mold.

Subsequently, after being compressed and retained for five seconds by applying a weight of 21.78 KN from an end surface on a pestle side using a hydraulic pump, the powder was extracted and molded into a columnar strand having an outer diameter of 9.55 mm and a length of 12.70 mm at a surface pressure of 30.42 KN/cm².

An obtained columnar molded article was dried for sixteen hours at 110° C. Subsequently, after an epoxy resin-based adhesive "bond quick 30" manufactured by Konishi Co., Ltd. was applied to a side surface of the columnar molded article, the columnar molded article was hardened such that the columnar molded article was not ignited from the side surface and was ignited only from end surfaces. The columnar molded article was used as a sample.

<Method for Measuring Burning Rate>

The columnar strand serving as the sample was set inside a hermetically sealed cylinder made of SUS having an internal volume of 1 liter and was pressurized to 6860 kPa and stabilized while completely replacing the inside of the cylinder with nitrogen.

Thereafter, a predetermined electric current was fed to a nichrome wire set in contact with an end surface of the strand. The cylindrical strand was ignited and combusted with fusing energy of the electric current.

Pressure behavior over time inside the cylinder was checked in a chart of a recorder. An elapsed time from a combustion start to a peak of pressure rise was checked from a scale of the chart. A numerical value calculated by dividing the stand length before the combustion by the elapsed time was set as burning rate.

An experiment in pressurization and stabilization at 4900 and 8820 kPa was performed in the same manner as explained above.

(3) Pressure Index

The burning rate was measured under a nitrogen atmosphere at pressures of 4900, 6860, and 8820 kPa using the columnar strand manufactured by the above method.

In Examples, the burning rate at 6860 kPa and the pressure index between 4900 and 8820 kPa are shown.

(4) Ignition Ability

A single-perforated molded article (having an outer diameter of about 4 mm, an inner diameter of about 1 mm, and a length of about 4 mm) obtained by extrusion-molding was set in a combustion chamber of a gas generator for an evaluation test (provided with a combustion chamber having a volume of 31 cm³ and having a total area of 79.8 mm² of a plurality of openings for gas discharge provided in an outer shell housing) by an amount for not forming an unnecessary gap in the combustion chamber but not to crack the single-perforated molded article when being sealed inside the gas generator. An amount of the single-perforated molded article used for the measurement is shown in Table 1.

The gas generator for the evaluation test includes an ignition device including an igniter provided with 55 mg of ZPP and 4.5 g of a transfer charge including nitroguanidine, strontium nitrate, carboxymethylcellulose sodium salt, and Japanese acid clay.

The gas generator for the evaluation test was set in a 60-liter tank (−40° C.) for the combustion test including a sensor for pressure measurement. The combustion test was performed by activating this gas generator.

Time of an activation start of the ignition device was set to 0. Ignition ability was evaluated according to an elapsed time after the activation start and a pressure value inside the 60-liter tank in the elapsed time.

If pressure at 10 milliseconds was equal to or higher than 80 kPa, it was determined that the ignition ability was excellent (⊚). If the pressure at 10 milliseconds was equal to or higher than 50 kPa and lower than 80 kPa, it was determined that the ignition ability was good (○). If the pressure at 10 milliseconds was lower than 50 kPa, it was determined that the ignition ability was bad (X).

(5) Method for Measuring Gas Concentration

Measurement was performed using a single-perforated molded article obtained in the same manner as explained in (2) burning rate <Method for preparing a columnar strand> and a gas generator for an evaluation test having the same specifications as in (4) Ignition ability.

A gas generator for an evaluation test including ignition device (having an igniter provided with 55 mg of ZPP and 4.5 g of a transfer charge including nitroguanidine, strontium nitrate, carboxymethylcellulose sodium salt, and Japanese acid clay) was set in a tank having an internal volume of 2800 liters. In this state, the single-perforated molded article was burnt at the room temperature (23° C.). $NO_2$, NO, CO, and $NH_3$ concentrations were measured by transmitting a combustion gas, which had been discharged into the tank, to FT-IR (VIR-9500 manufactured by JASCO Corporation). Values of the concentrations were obtained by averaging values at 3 minutes, 15 minutes, and 30 minutes after the combustion, respectively.

generator of Example 8. Note that, "the initial stage" shows a tank curve immediately after the manufacturing of the gas generator of Example 8. "Example 8" and "Comparative Example 1" show a tank curve after the gas generators were left for 400 hours in the atmosphere at the temperature of 107° C.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generating composition comprising:
   a gas generating agent including (a) fuel selected from the group consisting of triazine compounds and guanidine compounds, and (b) an oxidizing agent including a combination of (b-1) basic metal nitrate and (b-2) basic metal carbonate;

TABLE 1

| | Gas generating composition | | | | | Ratio | | Combustion | Burning rate | Pressure index | Ignition ability | | Exhaust gas (2800 L) | | | |
|---|---|---|---|---|---|---|---|---|---|---|---|---|---|---|---|---|
| | Content rate (% by mass) | | | | | | | | | | Low temperature | Amount of use | ppm (23° C.) | | | |
| | (a) | (a) | (b-1) | (b-2) | (c) | MC/NQ | BCN/BCC | temperature | (mm/s) | n | (−40° C.) | (g) | $NO_2$ | NO | CO | $NH_3$ |
| | MC | NQ | BCN | BCC | CMCNa | | | K | 7 MPa | | | | | | | |
| Example 1 | 13.43 | 14.50 | 62.07 | 5.00 | 5.00 | 0.93 | 12.41 | 1548 | 19.5 | 0.13 | ⊚ | 33.5 | 0 | 10 | 114 | 7 |
| Example 2 | 12.18 | 18.50 | 59.32 | 5.00 | 5.00 | 0.66 | 11.86 | 1583 | 19.2 | 0.15 | ⊚ | 33.9 | 0 | 4 | 142 | 34 |
| Example 3 | 12.23 | 14.50 | 58.27 | 10.00 | 5.00 | 0.84 | 5.83 | 1530 | 19.4 | 0.10 | ⊚ | 33.3 | 0 | 25 | 94 | 3 |
| Example 4 | 8.50 | 19.00 | 47.50 | 20.00 | 5.00 | 0.45 | 2.38 | 1531 | 19.7 | 0.10 | ⊚ | 34.2 | 0 | 15 | 87 | 10 |
| Example 5 | 6.75 | 21.00 | 42.25 | 25.00 | 5.00 | 0.32 | 1.69 | 1526 | 20.6 | 0.10 | ⊚ | 35.3 | 0 | 9 | 82 | 14 |
| Example 6 | 5.00 | 23.00 | 37.00 | 30.00 | 5.00 | 0.22 | 1.23 | 1520 | 20.4 | 0.09 | ○ | 34.3 | 0 | 9 | 80 | 15 |
| Example 7 | 15.66 | 10.8 | 65.54 | 3.00 | 5.00 | 1.45 | 21.85 | 1485 | 19.2 | 0.15 | ○ | 33.9 | 0 | 21 | 164 | 6 |

The compositions in Examples 1 to 7 do not include the absorbent. However, since the absorbent itself is chemically inactive, even when a small amount of the absorbent is included, combustibility of the gas generating agent does not have an adverse effect. This fact is also confirmed in a tank test by a gas generator in Example 8.

Example 8, Comparative Example 1

Evaluation by a Gas Generator

A single-perforated gas generating agent including 40 g of gas generating agent including melamine cyanurate/nitroguanidine/basic copper nitrate/basic copper carbonate/carboxymethyl cellulose (12.23% by mass/14.5% by mass/58.27% by mass/10.0% by mass/5.0% by mass) was manufactured for an actual inflator.

A gas generator in which a gas generating composition including this cylindrical gas generating agent and 2 g of granular zeolite serving as an absorbent was charged in a combustion chamber in the same manner as in the gas generator shown in FIG. 1 (Example 8), and a gas generator in which a gas generating composition including no absorbent was charged (Comparative Example 1) were produced.

A known 60-liter tank test described in paragraph 0098 of JP-A No. 2001-97176 was carried out using these gas generators. A result thereof is shown in FIG. 5.

Figure 5:
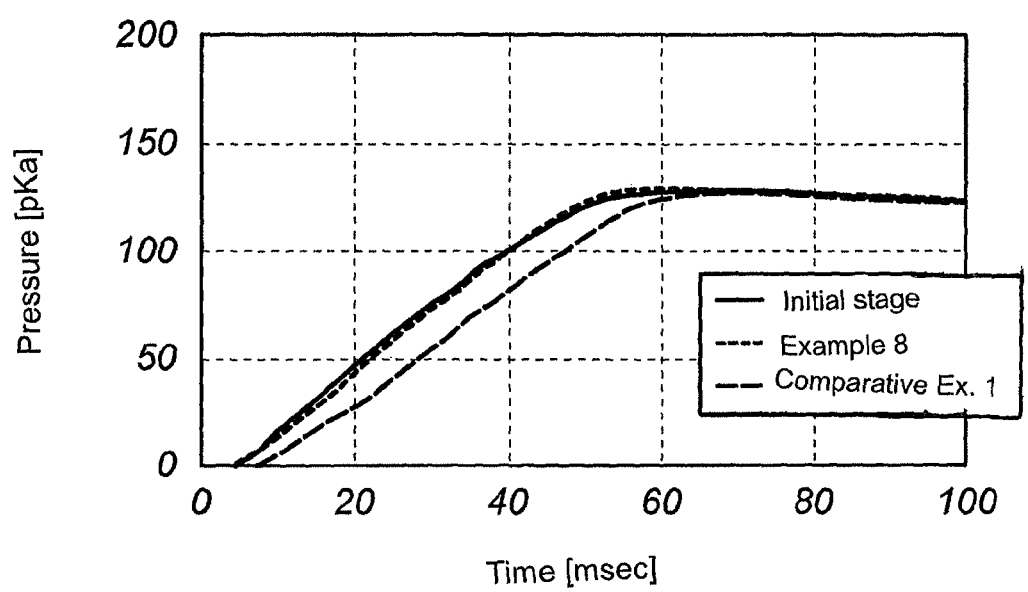
FIG. 5 is a diagram showing a result of a tank combustion test performed using the gas generator shown in FIG. 1.

As is confirmed from FIG. 5, the gas generator of Comparative Example 1 is slow in ignition compared with the gas (c) a binder; and
(d) an absorbent.

2. The gas generating composition according to claim 1, wherein the fuel component (a) comprises melamine cyanurate (MC) and nitroguanidine (NQ), and a mass ratio (MC/NQ) of MC and NQ is 0.2 to 1.5.

3. The gas generating composition according to claim 1, wherein, in the oxidizing agent component (b), contents of the basic metal nitrate of the component (b-1) and the basic metal carbonate of the component (b-2) are in a relation of (b-1)>(b-2).

4. The gas generating composition according to claim 1, wherein the absorbent is at least one selected from the group consisting of synthetic zeolite, natural zeolite, activated alumina, silica gel, activated carbon, and clay.

5. The gas generating composition according to claim 4, wherein the synthetic zeolite is selected from the group consisting of a 3A type (pore diameter 3 Å), a 4A type (pore diameter 4 Å), a 5A type (pore diameter 5 Å), and a 13X type (pore diameter 10 Å).

6. The gas generating composition according to claim 1, wherein the gas generating agent and the absorbent are not integrally molded.

7. The gas generating composition according to claim 1, wherein the gas generating agent and the absorbent are integrally molded.

8. A gas generator for an airbag apparatus using the gas generating composition according to claim 1, the gas generator comprising:

a housing having a gas discharge port and serving as an outer shell container;

a cylindrical filter arranged in the housing having the gas discharge port, such that an outer circumferential surface thereof directly faces the gas discharge port via a cylindrical space and that both end surfaces thereof are in contact with a top surface and a bottom surface of the housing respectively; and a combustion chamber formed by an inner space of the cylindrical filter, excluding an ignition device arranged in the center;

the gas generating composition being stored in the combustion chamber.

9. A gas generator for an airbag apparatus using the gas generating composition according to claim 1, the gas generator comprising:

a housing having a gas discharge port and serving as an outer shell container;

a cylindrical filter arranged in the housing having the gas discharge port, such that an outer circumferential surface thereof directly faces the gas discharge port via a cylindrical space and that both end surfaces thereof are in contact with a top surface and a bottom surface of the housing respectively; and a combustion chamber formed by an inner space of the cylindrical filter, excluding an ignition device arranged in the center, the combustion chamber being divided into two chambers by an air-permeable partition plate, one of the two chambers charged with a gas generating agent, the other chamber charged with an absorbent.

10. A gas generator for an airbag apparatus using the gas generating composition according to claim 1, the gas generator comprising:

a housing having a gas discharge port and serving as an outer shell container;

a cylindrical filter arranged in the housing having the gas discharge port, such that an outer circumferential surface thereof directly faces the gas discharge port via a cylindrical space and that both end surfaces thereof are in contact with a top surface and a bottom surface of the housing respectively;

a combustion chamber formed by an inner space of the cylindrical filter, excluding an ignition device arranged in the center;

the cylindrical space being divided by an air-permeable partition plate into a first space including the gas discharge port and a second space not including the gas discharge port;

a gas generating agent being charged in the combustion chamber; and an absorbent being charged in the second space.

11. A gas generator for an airbag apparatus using the gas generating composition according to claim 1, the gas generator comprising:

a housing having a gas discharge port and serving as an outer shell container;

a cylindrical filter arranged in the housing having the gas discharge port, such that an outer circumferential surface thereof directly faces the gas discharge port via a cylindrical space and that both end surfaces thereof are in contact with a top surface and a bottom surface of the housing respectively;

a combustion chamber formed by an inner space of the cylindrical filter, excluding an ignition device arranged in the center;

an annular recessed portion, which is formed by recessing an end surface of the cylindrical filter in an axial direction, being provided in at least one of boundary portions between the respective end surfaces of the cylindrical filter and the top surface and the bottom surface of the housing;

a gas generating agent being charged in the combustion chamber; and an absorbent being charged in the annular recessed portion.

12. The gas generating composition according to claim 6, wherein the molded article of the gas generating agent is larger than the molded article of the absorbent.

* * * * *